United States Patent [19]

Torii et al.

[11] Patent Number: 4,795,840
[45] Date of Patent: Jan. 3, 1989

[54] METHOD FOR PREPARING HYDROCARBON MIXTURE SOLVENT

[75] Inventors: Michiaki Torii; Seiji Hirooka, both of Tokyo, Japan

[73] Assignee: Nippon Petrochemicals Co., Ltd., Japan

[21] Appl. No.: 69,510

[22] Filed: Jul. 2, 1987

[30] Foreign Application Priority Data

Jul. 4, 1986 [JP] Japan .................................. 61-157591
Jul. 8, 1986 [JP] Japan .................................. 61-160566

[51] Int. Cl.$^4$ ............................................. C07C 9/00
[52] U.S. Cl. ...................................... 585/16; 208/143; 208/144; 585/266; 585/268; 585/269; 585/270
[58] Field of Search ................... 208/143, 144, 310 Z; 585/266, 268, 269, 270, 16

[56] References Cited

U.S. PATENT DOCUMENTS 2,988,502 6/1961 Ricards et al. .................. 208/310 Z
4,036,734 7/1977 Manne et al. ...................... 208/144

Primary Examiner—Curtis R. Davis
Attorney, Agent, or Firm—Ostrolenk, Faber, Gerb & Soffen

[57] ABSTRACT

The present invention provides a method for preparing a hydrocarbon mixture solvent comprising 1 to 15 wt % of alkyl tetralins and 0 to 10 wt % of aromatic hydrocarbons and having a boiling point of 160° to 300° C., the solvent being substantially free from naphthalene and biphenyl; the method being characterized by comprising the steps of subjecting a kerosene fraction having a boiling point of 150° to 300° C. to a nucleus hydrogenation treatment at a temperature of 100° to 300° C. at a pressure of 30 to 100 kg/cm$^2$ in the presence of a metallic catalyst for nucleus hydrogenation of aromatic nuclei; separating and removing at least a part of n-paraffins in the kerosene therefrom by the use of a molecular sieve made from a synthesized zeolite having pores of 5 Å in diameter in order to obtain a residual oil; and subjecting the latter to a rectification.

9 Claims, No Drawings

METHOD FOR PREPARING HYDROCARBON MIXTURE SOLVENT

BACKGROUND OF THE INVENTION

1. Field of the Invention

The present invention relates to a method for preparing a hydrocarbon mixture solvent containing specific components. More particularly, it relates to a method for preparing a non-pollution solvent which never or scarcely contains aromatic hydrocarbons having various problems of safety and the like but which nevertheless has a high dissolving power for a resin, a surface active agent or the like.

The solvents of the present invention can be used as various solvents for printing inks, above all, lithographic printing inks, for dry cleaning, for washing, for extraction, for paints and the like.

Dry cleaning can be defined as the cleaning of farrics in a substantially non-aqueous liquid medium (solvent). This process has evolved into a highly effective, low-cost and safe method of removing soils from all types of textiles.

2. Description of the Prior Art

Heretofore, petroleum solvents have been used as solvents for washing, stain removing, rubbers, paints, extraction, dry cleaning, printing inks and the like. This kind of petroleum solvent is composed of a petroleum fraction which is obtained merely by distillation in a suitable boiling range. Therefore, this solvent directly contains components derived from the petroleum which is the raw material, and thus aromatic hydrocarbons are also inevitably present therein in a perceptible amount.

For example, as solvents for a printing ink, particularly for a lithographic rotary printing ink, there have been employed various solvents having boiling points within the range of 230° to 300° C. Such a kind of typical solvent is a hydrocarbon solvent of a mineral oil type. This mineral oil solvent has problems. That is, the mineral oil usually contains 20 to 30% of aromatic components and therefore has the problem of toxicity. Further, since the mineral oil is a continuous product, its boiling range is extensive. In consequence, the mineral oil contains heavy components and is thus difficult to dry after printing.

Depending on the use application of the solvent, aromatic hydrocarbons such as benzene, toluene and xylene are added on purpose thereto.

On the grounds that aromatic hydrocarbons such as benzene, toluene and xylene have a bad influence on human bodies, their content has become regulated.

For example, the Specific Chemicals Trouble Preventing Regulations in an ordinance of the Labor Ministry in Japan put severe restrictions on materials in which the content of benzene is more than 1 vol %, and the Organic Solvent Toxication Preventing Regulations also puts restrictions on the handling of materials in which the total content of toluene and xylene is more than 5 wt %.

In America, compounds such as naphthalene and biphenyl are regulated under the Occupation Safety and Health Act (OSHA), and the duty of indicating that these compounds are used is also imposed.

For the purpose of solving the above-mentioned problems, for example, Japanese Patent Publication No. 2319/1984 discloses a method of producing a solvent for rubbers such as a rubber type volatile oil which is prepared from a by-product pyrolysis gasoline fraction by (a) hydrogenation, (b) solvent extraction for the removal of aromatics and (c) distillation. The product is naphthene-rich oil containing 1 vol % or less of benzene and 5 wt % or less of toluene and xylene and having an aniline point of 50° C. or lower. The content of naphthenes present in the solvent is however so great that the latter is not always satisfactory in point of performance, odor and the like. In other words, various physical properties of such a solvent are unbalanced.

Further, in the field of solvents for printing inks, it has been attempted to mix some nontoxic paraffins with the solvent in order to eliminate similar problems, but in this case, still other problems are posed which are, for example, easy solidification of the paraffins at a low temperature (5° to 7° C.), difficulty of adjusting varnish fluidity and poor dissolving power of the solvent for a resin. Furthermore, the simultaneous employment of the paraffins and naphthenes has also be attempted. However, if the content of the naphthenes in the solvent is great, its dissolving power for a resin will be poorer than with aromatic hydrocarbons, and the gloss of printed matter will deteriorate disadvantageously.

In the field of the dry cleaning solvents, it has been attempted to use a petroleum fraction which is nucleus-hydrogenated. Therefore, there has been used the fraction in which the content of aromatic components decreased and that of naphthene components increased however, such a fraction is expensive since a two-step nucleus hydrogenation process is usually used in its manufacture. In addition, the thus obtained solvent has, for example, the drawback that its power to dissolve a detergent at a low temperature is low. That is, in the case of the dry cleaning at a cleaning temperature which is elevated, stains which have gelled at a low temperature will be softened with the temperature rise and will be easy to remove. Moreover, the viscosity and a surface tension of the solvent will drop and permeability and dissolving power thereof will build up. The adsorption of the chosen surface active agent (detergent) will be accelerated, so that the stains will be swelled and will be liable to separate off conveniently.

As is definite from the above, elevating the cleaning temperature is extremely advantageous from the viewpoint of a washing effect, but it inversely causes the disadvantages that the quality of fabrics themselves tends to change and that the fabrics swell, weaken and thus break easily.

For these reasons, it is required that the cleaning be achieved even at a lower temperature on condition that cleaning results are sufficient.

Particularly with regard to animal fibers such as wool and silk as well as synthetic fibers, damage increases and dye and pressure treating agents tend to come off along with the rise of washing temperature. Hence, in the usual dry cleaning, the solvent is used at a temperature of about 20° to about 25° C. without heating particularly.

As described above, however, when the conventional fraction prepared by the mere hydrogenation is used as the solvent, the latter has a low dissolving power to detergent inconveniently.

SUMMARY OF THE INVENTION

An object of the present invention is to provide a method for preparing especial non-pollution hydrocarbon solvent which has no toxicity to human bodies and a less bad odor and which possesses a high dissolving power for a resin or the like.

Another object of the present invention is to provide a solvent which can simulataneously satisfy all the requirements of having no toxicity, a less bad odor and a high dissolving power for a resin; supplying printed matter with a gloss; permitting high-speed printing; and improving the shelf stability of a varnish.

Still another object of the present invention is to provide a solvent for dry cleaning which is excellent in washing power at low temperature and which is inexpensive and safe.

According to the present invention, there is provided a method for preparing a hydrocarbon mixture solvent comprising 1 to 15 wt % of alkyl tetralins and 0 to 10 wt % of aromatic hydrocarbons and having a boiling point of 160° to 300° C., the solvent being substantially free from naphthalene and biphenyl; the aforesaid method being characterized by comprising the steps of subjecting a kerosene fraction having a boiling point of 150° to 300° C. to a nucleus hydrogenation treatment at a temperature of 100° to 300° C. at a pressure of 30 to 100 kg/cm² in the presence of a metallic catalyst for nucleus hydrogenation of aromatic nuclei; separating and removing at least a part of n-paraffins in the kerosene therefrom by the use of a molecular sieve made from a synthesized zeolite having average pores of 5 Å in diameter in order to obtain a residual oil; and subjecting the latter to a rectification.

DESCRIPTION OF THE PREFERRED EMBODIMENTS

Now, the present invention will be described in detail.

In the present invention, a kerosene fraction having a boiling point of 150° to 300° C. is hydrogenated with the aid of a metallic catalyst for nucleus hydrogenation of aromatic nuclei. As this kind of catalyst, any of known metallic catalysts for the hydrogenation of the aromatic nuclei can be preferably used. Examples of the catalysts which can be preferably used in the present invention include nickel, nickel oxide, nickel/diatomaceous earth, Raney nickel, nickel/copper, platinum, platinum oxide, platinum/activated carbon, platinum/rhodium, platinum/alumina, platinum/lithium/alumina, rhodium/activated carbon, palladium, cobalt, Raney cobalt, ruthenium, tungsten sulfide/neckel sulfide/alumina and cobalt/molybdenum.

The pressure used in the present invention is within the range of 30 to 100 kg/cm² and the temperature is within the range of 100° to 300° C. When the pressure is lower than 30 kg/cm², or when the temperature is lower than 100° C., the hydrogenation does not make progress sufficiently. Inversely, both a higher pressure than 100 kg/cm² and a higher temperature than 300° C. are unsuitable because a secondary reaction such as a decomposition predominates. The period of time necessary for the hydrogenation can be suitably decided. For example, LHSV is usually within the range of 0.01 to 100.

With regard to the reaction system, either of a batch system and a continuous flow system can be taken. In general, the one-step hydrogenation suffices.

The aromatic hydrocarbon is nucleus-hydrogenated to naphthenes by means of the hydrogenation treatment, but a degree of the hydrogenation can be optionally decided in compliance with the above-mentioned catalyst, reaction conditions and the like. During this time, compounds of sulfur and nitrogen which are impurities are simultaneously removed. Further, the hydrogenation treatment is often accompanied by secondary reactions such as decomposition, isomerization and the like, so that products formed through these secondary reactions are also inevitably contained in the kerosene fraction.

Subsequently to the above-mentioned hydrogenation treatment, a molecular sieve made from a synthesized zeolite is used to separate and remove at least a part of n-paraffins in the kerosene fraction therefrom, thereby obtaining a residual oil.

The method for separating and obtaining n-paraffins from a hydrocarbon mixture by repeating adsorption and description in a gaseous or a liquid phase with the aid of a molecular sieve has been heretofore used industrially extensively as a manufacturing method of n-paraffins.

For example, there are the Molex process comprising the steps of using, as a fixed bed, a molecular sieve made from a synthesized zeolite having average pores of 5 Å and carrying out adsorption and desorption of n-paraffins alternately in a liquid phase, washing the molecular sieve, on which the n-paraffins are adsorbed, with a low-molecular paraffin for desorption in order to desorb the n-paraffins, and separating the joined low-molecular paraffin therefrom by distillation and recycling it; the TSF process (Texaco Selective Finishing Process) comprising the steps of adsorbing n-paraffins in a gaseous phase by the utilization of adsorption/desorption with the aid of a molecular sieve made from a synthesized zeolite having similar 5 Å pores, and carrying out the desorption of the n-paraffins by washing out them with a low-molecular paraffin; the Isosieve process in which a molecular sieve made from a similar synthesized zeolite having 5 Å pores is used but in which adsorption/desorption of n-paraffins onto the molecular sieve is carried out by repeating application and release of pressure; and the Esso process involving a vapor phase/liquid bed process, the Esso process comprising the steps of adsorbing n-paraffins continuously by a molecular sieve of a synthesized zeolite having 5 Å pores on a liquid bed in an adsorbing apparatus, desorbing the n-paraffins therefrom at a higher temperature than in the adsorption step in a recovery device, and returning the recovered molecular sieve from the recovery device to an adsorption device so as to reuse the molecular sieve.

The n-paraffins can be separated by any of these methods using the molecular sieve which is made from a synthesized zeolite.

In the processes for separating n-paraffins, the n-paraffins alone ought to be separated theoretically, but in a chosen process, hydrocarbons other than the n-paraffins are separated together with the latter, so that the content of components other than the n-paraffins in the obtained residual oil is liable to change. Taking this point into consideration, a urea adduct process using crystalline urea is also effective as a method for separating n-paraffins on an industrial scale. With regard to the present invention, however, it is proper to make use of the molecular seive made from a synthesized zeolite. The thus obtained n-paraffins can be utilized in compliance with their boiling points similarly to the usual n-paraffins. For example, they may be used as raw materials for the manufacture of straight-chain alkylbenzenes, as lubricating oils, or as other materials.

Next, the residual oil obtained by separating the n-paraffins from the hydrogenated kerosene fraction is subjected to a rectification. In this case, a known rectification apparatus may be used. For example, a rectification apparatus comprising two or more distillation columns may be selected, and light hydrocarbons are removed from the top of a first column and a desired fraction is taken out from the top of a second column or the tops of the second and later columns. Of course, if separation efficiency based on the number of distillation steps in each column and the like is proper, light hydrocarbons and heavy hydrocarbons may be removed respectively from top and bottom of the rectification apparatus comprising one distillation column, the desired fraction being be taken out from the middle portion of the column.

The above-mentioned method permits preparing a hydrocarbon mixture solvent which contains 1 to 15 wt %, preferably 1 to 14 wt %, of alkyl tetralins and 0 to 10 wt % of aromatic hydrocarbons but which does not virtually contain naphthalene and biphenyl, the boiling point of the solvent being within the range of 160° to 290° C.

The naphthenes present in the hydrocarbon mixture solvent regarding the present invention contribute to heightening the dissolving power of the solvent. Therefore, it is necessary that the naphthenes are present in an amount of 30 wt % or more. However, when the content of the naphthenes is more than 80 wt %, the bad odor characteristic of the naphthenes is too strong.

Further, isoparaffins present in the solvent contribute to weakening the odor of the solvent, improving its characteristics at low temperature, and building up the ressolving power of the solvent. The content of the isoparaffins is within the range of 15 to 40 wt %. When this content is less than 15 wt %, the above effects of the isoparaffins cannot be procured, and when it is more than 40 wt %, the dissolving power of the solvent for a resin deteriorates unpreferably.

The content of the n-paraffins is within the range of 0 to 20 wt %. When this content is more than 20 wt %, the dissolving power of the solvent drops and its fluidity at a low temperature also declines unpreferably.

The main components in the tetralins are alkyl tetralins, and these tetralins enhance the dissolving power of the solvent regarding the present invention. The content of the alkyl tetralins is 15 wt % or less, preferably within the range of 1 to 14 wt %. When this content is more than 15 wt %, the bad odor of the solvent is unpreferably too strong, and when it is less than 1 wt %, the dissolving power of the solvent is poor.

The content of the aromatic hydrocarbons is within the range of 0 to 10 wt %, preferably 0 to 5 wt %. When this content is in excess of 10 wt %, problems of bad odor and the like are posed and the problem of safety is under apprehension, though the dissolving power of the solvent remains high. Therefore, it is desirable that the content of the hydrocarbons is rather low. The solvent which is obtainable through the manufacturing method of the present invention is substantially free from aromatic hydrocarbons such as naphthalene and biphenyl about which there is apprehension about safety. In addition, the above solvent scarcely contains benzene, toluene and xylene.

With regard to the solvent of the present invention, the content of the aromatic hydrocarbons is so low that the problem of the safety can be solved, and a synergistic effect of the other respective components permits acquiring a higher dissolving power than in a conventional petroleum solvent. Besides, the solvent of the present case is superior to the conventional one in points of an odor and the like. Therefore, the components present in the solvent and their contents have important meanings.

It is necessary that the boiling point of the solvent regarding the present invention is within the range of 160° to 300° C., preferably 180° to 290° C. When the boiling point of the solvent is less than 180° C., this fact indicates that the solvent contains some aromatic components to which the regulations are applied, so that its odor is strong. For example, in the case that the solvent is used as a solvent for a printing ink, evaporation of the solvent in the steps of printing and drying is too fast, so that viscosity of the ink increases and paper breakage phenomenon occurs. In that event, the proper printing cannot be achieved. When the boiling point of the solvent is in excess of 290° C., the kinds and contents of the respective components present in the solvent are unbalanced with the result that intended physical properties cannot be acquired. Also in such a case, the solvent is rendered heavier, and therefore when it is used as the solvent for the printing ink, drying speed is low and thus printing efficiency is insufficient. Further, in a normal dry cleaning process, the dry cleaning solvent is drained from a tumble-type washer and most of the residual solvent is removed by cetrifugal extraction. A small amount of the remaining solvent is removed in heated dryers. Hence, if the solvent is rendered heavier, drying time in the heated dryers will be prolonged unpreferably.

An example will be described in which the solvent of the present invention is used as a printing ink solvent.

Ink

(a) Kind of Ink

A solvent of the present invention can be applied to various printing inks, particularly to a lithographic ink, more particularly to a rotary press ink.

(b) Resin for Ink

As a resin for the ink, various known resins can be employed. They can be used alone or in a combination thereof in compliance with the ultimate purpose. Examples of these usable resins include petroleum resins, their modified resins, rosin-modified phenol resins, rosin-modified alkyd resins and fatty acid- and oil-modified alkyd resins.

(c) Other Components for Ink

Additionally, there may be used any of linseed oil, tung oil, soybean oil and dehydrated castor oil as well as drying oils and semi-drying oils such as polymers and modified polymers of the above oils.

As a colorant, there may be used any of an organic pigment, an inorganic pigment, a fluorescent pigment, carbon black and a metallic powder.

In addition to the above materials, various additives which have been heretofore contained in the ink may be used, and examples of such additives include a wax, a grease, a thickener, a stabilizer, a dispersant, a filler and other known additives.

The solvent for the printing ink of the present invention can display such effects as cannot be obtained by each component alone.

That is, in the present invention, the solubility of the resin and the pigment in the solvent is synergistically heightened by the tetralins, and on the other hand, the content of the aromatic hydrocarbons is restrained to the minimum in order to solve the problems of toxicity, odor and safety. In addition, the content of n-paraffins is lowered so as to eliminate the drawbacks regarding dissolving power and fluidity at a low temperature.

The solvent of the present invention has the following advantages in contrast to a conventional solvent for inks:

(a) Since the solvent of the present invention does not contain benzene, toluene and xylene which are objects of the above-mentioned regulations, there are not problems of environmetal pollution and bad odor.

(b) Although a conventional solvent maintains a dissolving power with the aid of aromatic hydrocarbons which have the problem of toxicity, the solvent of the present case can have a high dissolving power in spite of low or no content of aromatic hydrocarbons.

(c) In the conventional solvent, lowering its odor and toxicity is carried out by adding n-paraffins, but in the solvent of the present case, such troubles are not present, even if the n-paraffins are not added thereto. In consequence, the solvent of the present case can prevent the enhancement of viscosity and the decline of fluidity which are attributable to a great deal of the n-paraffins.

(d) The solvent of the present case can provide printed matter with an excellent gloss.

(e) Since the solvent of the present invention is high in drying speed, printing efficiency can be improved.

(f) In the present invention, the solvent having an optimum composition can be prepared from a petroleum fraction by a serial process of hydrogenation, separation of n-paraffins and distillation, and therefore such intricate steps of preparing and mixing plural components as in the conventional case are unnecessary. In particular, when by-products formed during the mass production of n-paraffins which are raw materials of synthetic detergents are utilized, the solvent of the present invention can be economically prepared.

(g) The composition of the present invention is outside the application of the above regulations because of containing little biphenyl and naphthalene which are regulated by "Known Standards of Hazard and Toxicity of Chemicals and the Like" under OSHA and on which the duty of indicating them is imposed. Incidentally, this advantage is connected with the safety in the above-mentioned paragraph (a).

Next, an example will be described in which the solvent of the present invention is used as a dry cleaning solvent.

Detergent

The solvent of the present invention has a good washing power, even if no detergent is added thereto. However, the addition of detergents to the solvent of the present invention can greatly enhance the removal effect of many soils that are generally present in the garments.

As the detergents, any of anionic, cationic, amphoteric and nonionic surface active agents can be used. Examples of such usable detergents include soap-fatty acid mixtures; "mahogayy" or petroleum sulfonates; sulfosuccinic acid salts; alkylarenesulfonic acid salts; amine alkylarene sulfonates; fatty acid esters of sorbitol; alkoxylated alkanolamides such as ethoxylated alkanolamides; alkoxylated phenols such as ethoxylated phenols; alkoxylated phosphates such as ethoxylated phosphates. Further, enzymes are usable, too.

The greater an amount of soil in the solvent and consumption of water are, the higher the concentration of the detergents should be, because a certain amount of the detergents is consumed to disperse and dissolve them. However, the usual suitable concentration of the detergents in the solvent is from 0.01 to 30 wt %, preferably from 0.05 to 20 wt %.

The solvent of the present invention has the following features in contrast to the conventional solvent.

(a) Since the solvent of the present invention does not substantially contain aromatic compounds such as benzene, toluene, xylene, naphthalene and biphenyl to which the above regulations are applied, the problem of environmetal pollution is not present. Further, no problem of a bad odor is present either, and therefore cleaned garments have no odor.

(b) Since the solvent of the present invention has a greater dissolving power to detergents particularly at a low temperature than a solvent merely comprising a nucleus hydrogenated-petroleum fraction, washing can be achieved even at the low temperature, so that the damage of fibers can be sufficiently prevented.

The solvent of the present invention can also be applied to dry cleaning of the garments comprising a vegetable fiber such as cotton or flax, a regenerated fiber such as a rayon, a semisynthetic fiber such as an acetate, an animal fiber such as wool or silk, or a synthetic fiber such as a nylon, Tetoron, Cashmilon, a vinylon, Spandex or Saran.

(c) In particular, when by-products formed during the manufacture of n-paraffins which are raw materials of synthetic detergents are utilized to prepare the solvent of the present invention, its material cost can be reduced.

The thus obtained solvent of the present invention can be used as the above-mentioned solvent for printing inks or dry cleaning, and additionally as a solvent for a solution or a suspension polymerization, as a degreasing agent, as a solvent for a lacquer, washing, extraction or a paint, or as a rubber solvent.

EXAMPLES

Now, the present invention will be described in detail in accordance with examples. It should be noted that the scope of the present invention is not limited by these examples but by claims attached hereto.

Incidentally, temperatures are all in centigrade, and parts and percents are all by weight throughout this specification, unless otherwise specified.

EXAMPLE 1

A kerosene fraction (which was composed of 65 wt % of paraffins, 25 wt % of naphthenes and 10 wt % of aromatic hydrocarbons) having a boiling point of 150° to 280° C. which has been obtained by the distillation of a crude oil was hydrogenated under conditions of 280° C. and 90 kg/cm$^2$ by the use of a nickel-tungsten catalyst for hydrogenation of aromatic nuclei. The resulting product was then fed into a separating column packed with a molecular sieve made from a synthesized zeolite and having pores of 5 Å, and n-paraffins were removed out therefrom in accordance with the Molex process. The fraction in which the n-paraffins had been diminished was subjected to a precision distillation in a two-tower rectification apparatus in order to obtain a solvent fraction having a boiling point of 243° to 275° C. The composition and properties of the thus obtained solvent are set forth in Table 1.

EXAMPLE 2

The same prodcedure as in Example 1 was repeated with the exception that a kerosene fraction having different properties than in Example 1 was used, in order to obtain a solvent. The composition and properties of the solvent are set forth in Table 1.

COMPARATIVE EXAMPLE 1

The hydrogenation in Example 1 was carried out in a two-step manner in order to obtain a solvent in which the content of alkyl tetralins was 0 wt % (trace). The composition and properties of this solvent are set forth in Table 1.

COMPARATIVE EXAMPLE 2

A commercially available mineral oil solvent (boiling point 235° to 290° C.) and n-paraffins (boiling point 244° to 265° C.) were mixed with each other in equal weights. The composition and properties of the resulting mixed solvent are set forth in Table 1.

COMPARATIVE EXAMPLE 3

A commercially available mineral oil solvent (boiling point 235° to 290° C.) was used. Its composition and properties are set forth in Table 1.

Evaluation Test of Solvents

The test procedure of each factor in Table 2 was as follows:

(A) Odor

Ten men and women who had previously been trained for an odor-sensitive test were selected, and the evaluation of a solvent odor was made in an air conditioned room by them in accordance with the following evaluation standards of five ranks. Each result is represented with an average value.

1 ... Scarcely odorous
2 ... Slightly odorous
3 ... Odorous
4 ... Strongly odorous
5 ... Very strongly odorous

(B) Solubility of Resin

First, a DCPD resin or a rosin-modified phenol resin was dissolved in each solvent in an equal amount, and the same solvent was further added thereto so as to lower a resin concentration gradually. When a milky turbidity appeared, the resin concentration at this point was taken as the criterion of the solubility. It is here meant that the lower the concentration of the resin in the solvent, the higher a dissolving power of the solvent to the resin.

(C) Shelf Stability of Ink

An ink was prepared in accordance with the following prescription which is a typical example of a composition for offset rotary printing.

Prescription

| Rosin-modified phenol resin | 32.5 wt % |
|---|---|
| Linseed oil | 13.0 wt % |
| Pigment (Carmin 6B) | 17.5 wt % |
| Solvent | 37.0 wt % |

The shelf stability of the ink was measured by first placing the ink of the above-mentioned composition in a spread meter, and then reading out a spreading degree of the ink after 1 minute at 25° C. The shelf stability of the ink was represented by a ratio (%) of spread value after 1 month's storage to the value immediately after the preparation of the ink. In the case of ink in which fluidity does not change, that is, the shelf stability does not change, the ratio is 100, and in the case that the shelf stability declines, the ratio is more than 100.

(D) Gloss of Printed Matter

On a coated paper, 0.4 ml of the ink which had been prepared in accordance with the prescription in the above paragraph (C) was spread by the use of an RI tester, and after 24 hours' standing, gloss on the paper was measured by a 60°—60° glossmeter.

Results of Evaluation

As shown in Table 1, the solvents of Examples 1 and 2 do not contain benzene, toluene, xylene, naphthalene and biphenyl to which the above regulations are applied, and an increase in viscosity at a low temperature is not appreciated. On the contrary, in Comparative Example 2, solidification occurs at −7° C., and in Comparative Example 3, the viscosity rises remarkably at −10° C.

As set forth in Table 2, the solvent of Comparative Example 1 is poor in dissolving power, shelf stability and gloss on the printed matter, though showing good properties in Table 1. The solvent in Comparative Example 2 is good or slightly good in the respective items in Table 2 but has the serious fault that the solidification occurs at −7° C., as mentioned above. In contrast, the solvents in Examples 1 and 2 display excellent performances in the respective items in Table 2.

TABLE 1

|  | Example | | Comp. Example | | |
|---|---|---|---|---|---|
|  | 1 | 2 | 1 | 2 | 3 |
| Composition (wt %) | | | | | |
| Naphthenes | 40 | 43 | 49.9 | 15 | 30 |
| Isoparaffins | 33 | 33 | 33 | 13 | 25 |
| n-Paraffins | 17 | 14 | 17 | 62 | 25 |
| Alkyl Tetralins | 7 | 7 | 0 | 0 | 0 |
| Aromatic Hydrocarbons*1 | 3 | 3 | 0.1 | 10 | 20 |
| Properties | | | | | |
| Specific Gravity (15/4) | 0.813 | 0.812 | 0.811 | 0.8045 | 0.840 |
| Flash Point (°C.) | 110 | 110 | 112 | 115 | 120 |
| Aniline Point (°C.) | 77 | 78 | 83 | 77.1 | 68.0 |
| Viscosity (cSt) | | | | | |

TABLE 1-continued

|  | Example | | Comp. Example | | |
|---|---|---|---|---|---|
|  | 1 | 2 | 1 | 2 | 3 |
| 40° C. | 2.5 | 2.4 | 2.5 | 2.6 | 3.1 |
| 0° C. | 6.9 | 6.7 | 6.9 | 6.8 | 9.2 |
| −10° C. | 9.9 | 9.7 | 9.9 | *2 | 14.0 |
| Range of Boiling Point (°C.) | 243–275 | 243–270 | 245–275 | 235–290 | 235–290 |
| Content (wt %) of Compound to which Regulations were Applied: | | | | | |
| Total of Benzene, Toluene and Xylene | 0 | 0 | 0 | 0 | 0 |
| Naphthalene | 0 | 0 | 0 | 5 | 2 |
| Biphenyl | 0 | 0 | 0 | 2 | 1 |

*1 The aromatic hydrocarbons contained no alkyl tetralins.
*2 Solidification occurred at −7° C.

TABLE 2

|  | Odor of Solvent | Solubility of Resin and Pigment | | Shelf Stability of Varnish (%) | Gloss of Printed Matter |
|---|---|---|---|---|---|
|  |  | Rosin | DCPD |  |  |
| Example |  |  |  |  |  |
| 1 | 2.0 | 29 | 5 | 100 | 70 |
| 2 | 2.7 | 28 | 6 | 100 | 70 |
| Comp. Ex. |  |  |  |  |  |
| 1 | 2.7 | 40 | 10 | 115 | 60 |
| 2 | 2.8 | 50 | 20 | 100 | 65 |
| 3 | 3.9 | 40 | 5 | 100 | 65 |

The above rosin was a rosin-modified phenol resin (trade name Tamanol-354; made by Arakawa Kagaku Co., Ltd.) (softening point 170.5° C.; acid value 13.8 mg KOH/g).
The above DCPD was a DCPD/methacrylic copolymer resin (softening point 150.0° C.; acid value 14.1 mg KOH/g).

EXAMPLE 3

As in Example 1, the fraction in which n-paraffins had been diminished was subjected to a rectification by the use of a two-tower precision distillation apparatus in order to obtain a solvent fraction for dry cleaning. The solvent had a boiling point of 177° to 200° C., and its composition and properties are shown in Table 3.

COMPARATIVE EXAMPLES 4 and 5

In Comparative Examples 4 and 5, there were selected Shell Brightsol (trade name) made by Shell Petrochemical Co., Ltd. and Exxsol D-40 (trade name) made by Exxon Co., Ltd. which were solvents for dry cleaning and which were obtained by subjecting a kerosene fraction to a two-step hydrogenation treatment. The compositions and properties thereof are set forth in Table 3.

TABLE 3

|  | Example | Comp. Example | |
|---|---|---|---|
|  | 3 | 4 | 5 |
| Composition (wt %) | | | |
| Naphthenes | 40 | 40 | 50 |
| Isoparaffins | 32 | 30 | 25 |
| n-Paraffins | 17 | 30 | 25 |
| Alkyl Tetralins | 7 | 0 | 0 |
| Aromatic Hydrocarbons* | 4 | 0 | 0 |
| Properties | | | |
| Specific Gravity (15/4) | 0.816 | 0.788 | 0.770 |
| Flash Point (°C.) | 62 | 42 | 40 |
| Aniline Point (°C.) | 58 | 62 | 68 |
| Range of Boiling Point (°C.) | 177–200 | 154–197 | 159–193 |
| Content (wt %) of Compound to which Regulations were Applied: | | | |
| Total of Benzene, Toluene and Xylene | 0 | 0 | 0 |
| Naphthalene | 0 | 0 | 0 |
| Biphenyl | 0 | 0 | 0 |

*The aromatic hydrocarbons contained no alkyl tetralins.

Miscibility Tests of Commercial Detergents for Dry Cleaning (1) A miscibility test immediately after 5% of a detergent for dry cleaning was dissolved in a solvent.

(2) A miscibility test after the solution of the above paragraph (1) was allowed to stand overnight in the atmosphere at room temperature and at a relative humidity of 70 to 80%.

(3) A miscibility test after the solution of the above paragraph (1) was allowed to stand overnight in the atmosphere at a low temperature of −20° C.

In accordance with each test procedure mentioned above, a state of each solution was observed, thereby estimating miscibility.

With regard to the respective dry cleaning solvents in Example 3 and Comparative Examples 4 and 5, the tests were carried out by the use of 20 kinds of commercial detergents (15 kinds of anionic series, 2 kinds of cationic series, 2 kinds of nonionic series and 2 kinds of amphoteric series) for dry cleaning.

The results are set forth in Table 4 where each result is represented by the number of insoluble (cloudy tubidity or separation) detergents of the 20 kinds thereof.

As understood from the results of Table 4, the solvents (Comparative Examples 4 and 5) prepared by the mere hydrogenation of the petroleum fraction are poor in miscibility at a low temperature.

With regard to the solvents of these comparative examples, their manufacturing costs are rather high, since they are manufactured through the two-step nucleus hydrogenation treatment.

In contrast, the solvent of the present invention is excellent in miscibility at a low temperature, and in particular, when by-products made during the manufacture of n-paraffins which are raw materials of synthetic detergents are utilized, the inexpensive solvent can be obtained.

TABLE 4

| Results of Miscibility Tests | | | |
|---|---|---|---|
| | Example | Comp. Example | |
| | 3 | 4 | 5 |
| Room Temp. (ca. 20° C.) | 0 | 1 | 6 |
| High Humidity (70 to 80%) | 0 | 4 | 6 |
| Low Temperature (−20° C.) | 1 | 7 | 13 |

What is claimed is:

1. A method for preparing a hydrocarbon mixture solvent of high dissolving power comprising 1 to 15 wt % of alkyl tetralins and 0 to 10 wt % of aromatic hydrocarbons, 30 to 80 wt % of naphthenes, 15 to 40 wt % of isoparaffins and 0 to 20 wt % of n-paraffins, and having a boiling point of 160° to 300° C., said solvent being substantially free from naphthalene and biphenyl; said method being characterized by comprising the steps of subjecting a kerosene fraction having a boiling point of 150° to 300° C. to a nucleus hydrogenation treatment at a temperature of 100° to 300° C. at a pressure of 30 to 100 kg/cm² in the presence of a metallic catalyst for nucleus hydrogenation of aromatic nuclei; separating and removing at least a part of n-paraffins in said kerosene therefrom by the use of a molecular sieve made from a synthesized zeolite having average pores of 5 Å in diameter in order to obtain a residual oil; and subjecting the latter to a rectification.

2. A method for preparing a hydrocarbon mixture solvent according to claim 1 wherein said metals are selected from the group consisting of nickel, copper, cobait, ruthenium, tungsten, molybdenum, platinum, rhodium and palladium.

3. A method for preparing a hydrocarbon mixture solvent according to claim 1 comprising 1 to 14 weight % of alkyl tetralins, 0 to 5 weight % of aromatic hydrocarbons and having a boiling point of 180° to 290° C.

4. A method for preparing a hydrocarbon mixture solvent according to claim 3 wherein a kerosene fraction having a boiling point of 150° to 280° C. is subjected to a nucleus hydrogenation treatment in the presence of a tungsten and nickel containing catalyst and the hydrocarbon mixture solvent has a boiling point of 243° to 275° C.

5. A method for preparing a hydrocarbon mixture solvent according to claim 3 wherein a kerosene fraction having a boiling point of 177° to 200° C. is subjected to a nucleus hydrogenation treatment in the presence of a tungsten and nickel containing catalyst and the hydrocarbon mixture solvent has a boiling point of 243° to 275° C.

6. A hydrocarbon mixture solvent of high dissolving power comprising 1 to 15 weight % alkyl tetralin, 0 to 15 weight % of aromatic hydrocarbons, 30 to 80 weight % of naphthenes, 15 to 40 weight % of isoparaffins and 0 to 20 weight % of n-paraffins and having a boiling point of 160° to 300° C., said solvent being substantially free from naphthalene and biphenyl, produced by the process of claim 1.

7. A hydrocarbon mixture solvent according to claim 6 containing 1 to 14 weight % of alkyl tetralin, 0 to 5 weight % of aromatic hydrocarbons and having a boiling point of 180° to 290° C.

8. A hydrocarbon mixture solvent according to claim 7 having a boiling point of 243° to 275° C.

9. A hydrocarbon mixture solvent according to claim 6 having a boiling point of 177° to 200° C.

* * * * *